(12) United States Patent
Frank

(10) Patent No.: US 10,080,198 B2
(45) Date of Patent: Sep. 18, 2018

(54) METHOD AND APPARATUS FOR DETERMINING THAT AN ALMOST-CONTIGUOUS RESOURCE ALLOCATION A-MPR APPLIES TO AN UPLINK TRANSMISSION

(71) Applicant: MOTOROLA MOBILITY LLC, Chicago, IL (US)

(72) Inventor: Colin Frank, Park Ridge, IL (US)

(73) Assignee: Motorola Mobility LLC, Chicago, IL (US)

( * ) Notice: Subject to any disclaimer, the term of this patent is extended or adjusted under 35 U.S.C. 154(b) by 113 days.

(21) Appl. No.: 15/046,511

(22) Filed: Feb. 18, 2016

(65) Prior Publication Data

US 2016/0345298 A1   Nov. 24, 2016

Related U.S. Application Data

(60) Provisional application No. 62/163,330, filed on May 18, 2015.

(51) Int. Cl.
*H04W 52/14* (2009.01)
*H04W 72/04* (2009.01)

(52) U.S. Cl.
CPC ......... *H04W 52/146* (2013.01); *H04W 72/04* (2013.01); *H04W 72/044* (2013.01)

(58) Field of Classification Search
CPC .. H04W 72/04; H04W 52/146; H04W 72/044
See application file for complete search history.

(56) References Cited

U.S. PATENT DOCUMENTS

| 9,451,554 B1 * | 9/2016 | Singh | H04W 52/146 |
| 9,661,590 B2 * | 5/2017 | Haim | H04W 52/365 |

(Continued)

FOREIGN PATENT DOCUMENTS

EP   2557708 A1   2/2013

OTHER PUBLICATIONS

Jean-Aicard Fabien, "Methods and Devices for Calculation of Uplink Transmission Power", U.S. Appl. No. 14/257,136, filed Apr. 21, 2014.

(Continued)

*Primary Examiner* — Hashim Bhatti
(74) *Attorney, Agent, or Firm* — Matthew C. Loppnow; The Watson I.P. Group, PLC

(57) ABSTRACT

A method and apparatus determine that an almost-contiguous resource allocation Additional Maximum Power Reduction (A-MPR) applies to an uplink transmission power. An indication of a resource allocation of resource blocks for a transmission can be received. The resource allocation can be ascertained to be a non-contiguous allocation of resource blocks. An almost-contiguous resource allocation Additional Maximum Power Reduction (A-MPR) can be determined to apply to an uplink transmission power for the transmission. An almost-contiguous resource allocation can be defined as a contiguous resource allocation of resource blocks from which resource blocks are punctured and the punctured resource blocks are contained in a contiguous region overlapping a boundary between the lower frequency carrier and the adjacent upper frequency carrier. The punctured resource blocks can be resource blocks that are not allocated for the transmission. The transmission can be performed based on the uplink transmission power with the applied A-MPR.

20 Claims, 8 Drawing Sheets

(56) References Cited

U.S. PATENT DOCUMENTS

| | | | |
|---|---|---|---|
| 2013/0039289 A1 | 2/2013 | Lee | |
| 2014/0341126 A1* | 11/2014 | Piipponen | H04W 72/04 370/329 |
| 2015/0245302 A1* | 8/2015 | Lim | H04W 52/34 455/522 |
| 2015/0304962 A1* | 10/2015 | Fabien | H04W 52/247 370/329 |
| 2017/0142733 A1* | 5/2017 | Wang | H04W 72/082 |
| 2017/0163399 A1* | 6/2017 | Lim | H04L 5/0066 |
| 2017/0288842 A1* | 10/2017 | Lim | H04L 5/14 |

OTHER PUBLICATIONS

Jurca, Dan, "PCT Written Opinion of the International Searching Authority," International Application No. PCT/US2016/027037, European Patent Office, dated Jul. 20, 2016.

Jurca, Dan, "PCT International Search Report," International Application No. PCT/US2016/027037, European Patent Office, dated Jul. 20, 2016.

Motorola Mobility: 11 A-MPR for Contiguous CA with Almost-Contiguous Resource Allocations and CANS Signalling, 3GPP Draft; R4-146S03. 3rd Generation Partnership Project (3GPP), Mobile Competence Centre ; 650. Route des Lucioles ; F-06921 Sophia-Antipolis Cedex, France, vol. RAN WG4. No. Singapore; Oct. 6, 2014-Oct. 10, 2014, Sep. 30, 2014.

\* cited by examiner

METHOD AND APPARATUS FOR DETERMINING THAT AN ALMOST-CONTIGUOUS RESOURCE ALLOCATION A-MPR APPLIES TO AN UPLINK TRANSMISSION

CROSS-REFERENCE TO RELATED APPLICATIONS

This application claims priority to a provisional application entitled "Limitations on Almost-contiguous Resource Allocations Used for A-MPR Reduction with Carrier Aggregation," Application No. 62/163,330, filed on May 18, 2015, and commonly assigned to the assignee of the present application, which is hereby incorporated by reference.

BACKGROUND

1. Field

The present disclosure is directed to a method and apparatus that determine that an almost-contiguous resource allocation Additional Maximum Power Reduction (A-MPR) applies to an uplink transmission power. More particularly, the present disclosure relates to determination of uplink transmission power for contiguous, non-contiguous, and almost-contiguous resource-block allocations.

2. Introduction

Presently, wireless communication devices, such as User Equipment (UE), communicate with other communication devices using wireless signals. Carrier aggregation is a feature for increasing peak and average user throughput of UEs by enabling the UE to exploit unused resources on a secondary component carrier. In the absence of carrier aggregation, the resource blocks on the two component carriers are segregated so that UE's assigned to a first component carrier cannot be allocated unused resources on the second component carrier. Carrier aggregation is especially beneficial if the loading of the two component carriers is unbalanced so that many of the resource blocks on the second component carrier would be unused if they cannot be assigned to UE's on the first component carrier. Carrier aggregation also increases the peak data rate achievable by the UE. However, reduced transmission power levels may be required on the UE to meet emissions requirements and to limit interference into adjacent channels due to non-linear characteristics of UE power amplifiers. In some cases of uplink carrier aggregation, a required Additional Maximum Power Reduction (A-MPR) for determining uplink transmission power is large. Presently, the A-MPR allowed for uplink carrier aggregation is specified in two different ways. One way is specifically for contiguous allocations and the other way is for non-contiguous allocations.

For non-contiguous allocations, the A-MPR is a function of the allocation ratio which is defined as the ratio of the number of RB's allocated to the UE over all carriers, $N_{RB\_alloc}$, to the sum of the total number of RB's over the aggregated carriers $N_{RB\_agg}$. For contiguous allocations, the A-MPR is in tabular form and is a function of one or more of the allocation parameters $RB_{start}$, $RB_{end}$, and $L_{CRB}$, where $L_{CRB}$ is the number of contiguous RB's in the contiguous allocation.

Typically, for a given number of allocated RB's ($RB_{alloc}$), the A-MPR allowed for a non-contiguous allocation is much larger than the A-MPR allocated for contiguous allocation. In particular, for an allocation ratio of 0.5, the A-MPR allowed for a non-contiguous allocation can be more than 4.5 dB greater than the A-MPR allowed for a contiguous allocation with the same allocation ratio. From a system perspective, large A-MPR is detrimental since a reduction in UE transmit power reduces the range and/or throughput achievable on the uplink.

While the contiguous A-MPR formulation is effective in reducing the A-MPR allowed to the UE, there is a problem in that contiguous allocations that span the boundary between the contiguously aggregated carriers will typically collide with the PUCCH resources that are configured at the edge of each carrier. Thus, in any subframe containing a PUCCH transmission (which is most subframes), it will not be possible to have a contiguous allocation that spans the boundary between carriers. There is a further problem that there is no clear understanding of the application of A-MPR to an almost-contiguous resource allocation spanning a boundary between two aggregated carriers that is part of a contiguous resource allocation punctured by resource blocks.

Thus, there is a need for a method and apparatus for determining that an almost-contiguous resource allocation A-MPR applies to an uplink transmission power.

BRIEF DESCRIPTION OF THE DRAWINGS

In order to describe the manner in which advantages and features of the disclosure can be obtained, a description of the disclosure is rendered by reference to specific embodiments thereof which are illustrated in the appended drawings. These drawings depict only example embodiments of the disclosure and are not therefore to be considered to be limiting of its scope.

DETAILED DESCRIPTION

Embodiments provide a method and apparatus that determine that an almost-contiguous resource allocation Additional Maximum Power Reduction (A-MPR) applies to an uplink transmission power.

According to a possible embodiment, an indication of a resource allocation of resource blocks for a transmission can be received. The resource allocation can be ascertained to be a non-contiguous allocation of resource blocks. An almost-contiguous resource allocation Additional Maximum Power Reduction (A-MPR) can be determined to apply to an uplink transmission power for the transmission. An almost-contiguous resource allocation can be defined as a contiguous resource allocation of resource blocks from which resource blocks are punctured and the punctured resource blocks are contained in a contiguous region overlapping a boundary between the lower frequency carrier and the adjacent upper frequency carrier. The punctured resource blocks can be resource blocks that are not allocated for the transmission. The transmission can be performed based on the uplink transmission power with the applied A-MPR.

According to another possible embodiment, a non-contiguous allocation of resource blocks can be allocated for an uplink transmission from a mobile station. An indication of the non-contiguous allocation of resource blocks for the uplink transmission can be transmitted. An almost-contiguous resource allocation Additional Maximum Power Reduction (A-MPR) can be determined to apply to an uplink transmission power for the uplink transmission. An almost-contiguous resource allocation can be defined as a contiguous resource allocation of resource blocks from which resource blocks are punctured and the punctured resource blocks are contained in a contiguous region overlapping a boundary between the lower frequency carrier and the adjacent upper frequency carrier. The punctured resource blocks can be resource blocks that are not allocated for the transmission. An uplink transmission can be received based on the uplink transmission power with the applied A-MPR.

Figure 1:
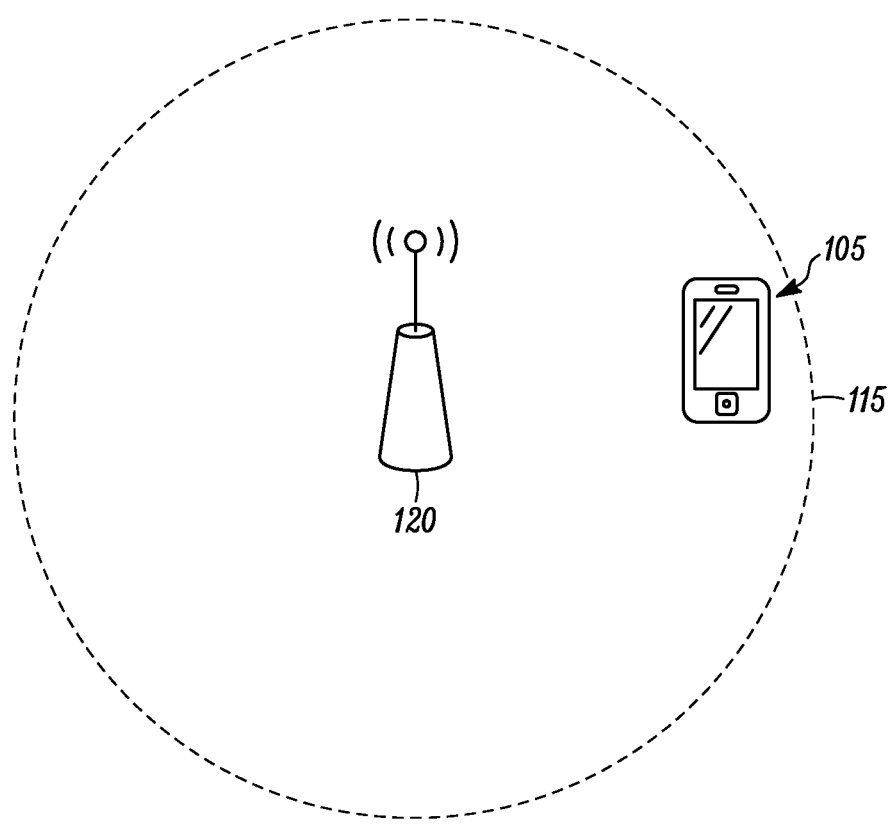
FIG. 1 is an example illustration of a block diagram including a mobile station and a wireless network according to a possible embodiment.

FIG. 1 is an example illustration of a block diagram 100 including a mobile station 105, such as a receiving device and/or transmitting device, and a wireless network 115 according to a possible embodiment. The mobile station 105 is configured for communication with the wireless network 115 via a base station 120, such as a transmitting device and/or receiving device like an eNB. Possible implementations of the mobile station 105 include a mobile phone, a smartphone, a tablet computer, a laptop, or other computing device. In one embodiment, the wireless network 115 is a cellular, such as a Long Term Evolution (LTE), network. In other embodiments, the wireless network 115 is a Wi-Fi network, a Wireless Local Area Network (WLAN), or any other wireless network.

Figure 2:
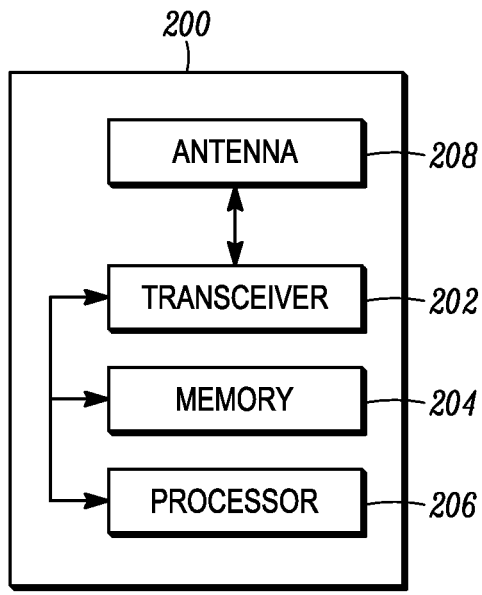
FIG. 2 is an example illustration of a block diagram showing a base station according to a possible embodiment.

FIG. 2 is an example illustration of a block diagram 200 showing a base station, such as the base station 120, according to a possible embodiment. Possible implementations of the base station include an Evolved Universal Terrestrial Radio Access base station, an Evolved NodeB (eNB), a transmission point, a Remote Radio Head, a home eNB, and a femtocell. In one example, the base station is an eNB that controls a macrocell of the wireless network 115. The base station may include multiple network entities. For example, the base station may in fact be two or more base stations operating in conjunction with one another to operate as a single base station or network entity. The base station may also be a portion of another network entity.

The base station includes a transceiver 202, which can transmit data to and receive data from other devices such as the mobile station 105. The base station also includes at least one memory 204 and a processor 206 that can execute programs stored in the memory 204. The processor 206 writes data to and reads data from the memory 204. During operation, the transceiver 202 receives data from the processor 206 and transmits Radio Frequency ("RF") signals representing the data via antenna 208. Similarly, the transceiver 202 receives RF signals, converts the RF signals into appropriately formatted data, and provides the data to the processor 206. The processor 206 retrieves instructions from the memory 204 and, based on those instructions, provides outgoing data to, or receives incoming data from the transceiver 202.

The base station is configured to allocate radio resources, such as frames, subframes, resource blocks, uplink carriers, downlink carriers, subcarriers, and other radio resources, for mobile stations, such as the mobile station 105. The radio resources can be allocated for communication between a mobile station and the base station, such as an uplink transmission from the mobile station to the base station. The base station is configured to send a control message that indicates allocated radio resources to the mobile station.

The base station in one example allocates a contiguous allocation of resource blocks for the uplink transmission. In another example, the base station allocates a non-contiguous allocation of resource blocks for the uplink transmission. In some embodiments, the base station performs carrier aggregation of two or more carriers (e.g., uplink carriers). In this case, the allocation of resource blocks can include resource blocks on two or more adjacent uplink carriers.

Figure 3:
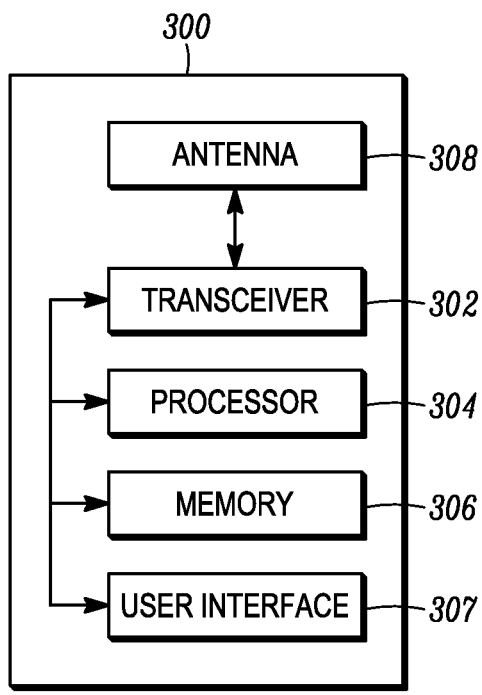
FIG. 3 is an example illustration of a block diagram showing a mobile station according to a possible embodiment.

FIG. 3 is an example illustration of a block diagram 300 showing a mobile station, such as the mobile station 105, according to a possible embodiment. The mobile station includes a transceiver 302 configured to transmit data to and receive data from other devices such as the base station 120. The mobile station also includes a processor 304 that executes stored programs and at least one memory 306. The processor 304 writes data to and reads data from the memory 306. The mobile station includes a user interface 307 having a keypad, display screen, touch screen, microphone, speaker, or the like. During operation, the transceiver 302 receives data from the processor 304 and transmits RF signals representing the data via an antenna 308. Similarly, the transceiver 302 receives RF signals, converts the RF signals into appropriately formatted data, and provides the data to the processor 304. The processor 304 retrieves instructions from the memory 306 and, based on those instructions, provides outgoing data to, or receives incoming data from, the transceiver 302.

In an embodiment, the user interface 307 displays the output of various application programs executed by the processor 304. The user interface 307 additionally includes on-screen buttons that the user can press in order to cause the mobile station to respond. Content shown on the user interface 307 is generally provided to the user interface at the direction of the processor 304. Similarly, information received through the user interface 307 is provided to the processor 304, which may then cause the mobile station to carry out a function whose effects may or may not necessarily be apparent to a user.

Figure 4:
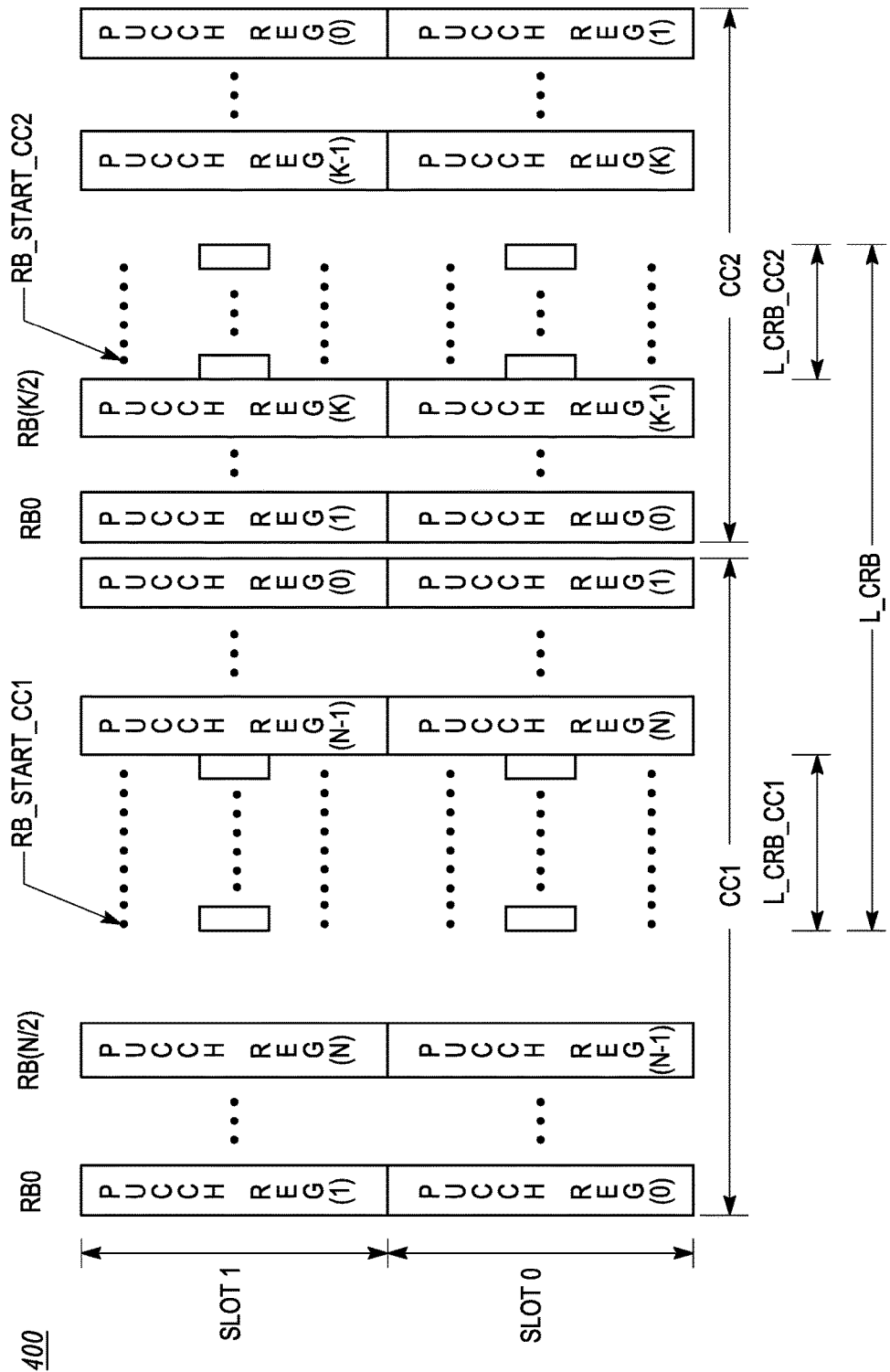
FIG. 4 is an example diagram that shows a non-contiguous allocation of resource blocks for an uplink transmission by a mobile station according to a possible embodiment.

FIG. 4 is an example diagram 400 that shows a non-contiguous allocation of resource blocks for an uplink transmission by a mobile station, such as the mobile station 105, according to a possible embodiment. As shown, two adjacent component carriers ("CC1" and "CC2") include an allocation of resource blocks allocated by the base station for the uplink transmission. The allocation includes a first contiguous set of resource blocks on CC1, with a first resource block at RB_start_CC1 and bandwidth of L_CRB_CC1. The allocation also includes a second contiguous set of resource blocks on CC2, with a first resource block at RB_start_CC2 and bandwidth of L_CRB_CC2. The first and second sets of resource blocks are separated or "punctured" by resource blocks for the PUCCH on both CC1 and CC2. An overall bandwidth of the allocation is denoted as L_CRB, and includes the bandwidth of the first set of resource blocks, the bandwidth of the second set of resource blocks, and the punctured PUCCH resource blocks on both CC1 and CC2.

For contiguous allocations, there are currently eight tables defined which specify allowed A-MPR values. The allowed A-MPR values for non-contiguous allocations are defined in eight formulas based on a carrier aggregation signaling value ("CA_NS"). The first of these formulas applies in the event that CA_NS_31 is signaled. The seven remaining formulas are defined for use with the signaling of CA_NS_01, CA_NS_02, CA_NS_03, CA_NS_04, CA_NS_05, CA_NS_06, CA_NS_07, and CA_NS_08. To see the benefit of using the tables for contiguous allocations to specify A-MPR rather than the formulas for non-contiguous allocations, an example is described herein using an allocation ratio of 0.5. With the non-contiguous formulas, the allowed A-MPR is independent of specific allocations and is defined for each possible CA_NS value. For comparison, the A-MPR allowed for contiguous allocations (taken from the contiguous tables) is shown for the corresponding aggregation scenarios in Tables 1, 2 and 3. The A-MPR values shown are the smallest A-MPR values compatible with a contiguous allocation having an allocation ratio of 0.5. Note that it is possible to find contiguous allocations which require more A-MPR.

It can be noted in Third Generation Partnership Project Technical Specification 36.101 (TS 36.101) that when CA_NS is signaled, A-MPR is used, and MPR is defined to be equal to 0. Conversely, when no CA_NS is signaled, maximum power reduction (MPR) is used, and A-MPR is defined to be equal to 0. However, the method described below in which a second A-MPR is developed for non-contiguous resource allocations from the A-MPR defined for contiguous allocations can be applied with respect to MPR in the case that no NS_CA is signaled.

TABLE 1

A-MPR reduction from using contiguous A-MPR tables rather than non-contiguous A-MPR formula for contiguous allocations for CA_NS_01 through CA_NS_05

| CA_NS signalled | A-MPR for A = 0.5 with non-contiguous formula | Minimum A-MPR for contiguous allocation with A = 0.5 | | A-MPR reduction for contiguous allocation | |
|---|---|---|---|---|---|
| | | 75 + 75 RB's | 100 + 100 RB's | 75 + 75 RB's | 100 + 100 RB's |
| CA_NS_01 | 9.5 | 5 | 6 | 4.5 | 3.5 |
| CA_NS_02 | 9.5 | 2 | 3 | 7.5 | 6.5 |
| CA_NS_03 | 11.5 | 2 | 4 | 9.5 | 7.5 |
| CA_NS_04 | 4.5 | 4 | 3 | 0.5 | 1.5 |
| CA_NS_05 | 9.5 | 5 | 6 | 4.5 | 3.5 |

TABLE 2

A-MPR reduction from using contiguous A-MPR tables rather than non-contiguous A-MPR formula for contiguous allocations for CA_NS_06

| A-MPR for A = 0.5 with non-contiguous formula | Minimum A-MPR for contiguous allocation with A = 0.5 | | | | A-MPR reduction for contiguous allocation | | | |
|---|---|---|---|---|---|---|---|---|
| | 75 + 100/ 100 + 75 RB's | 50 + 100/ 100 + 50 RB's | 75 + 75 RB's | 100 + 100 RB's | 75 + 100/ 100 + 75 RB's | 50 + 100/ 100 + 50 RB's | 75 + 75 RB's | 100 + 100 RB's |
| 11.5 | 3 | 3 | 2 | 0 | 8.5 | 8.5 | 9.5 | 11.5 |

TABLE 3

A-MPR reduction from using contiguous A-MPR tables rather than non-contiguous A-MPR formula for contiguous allocations for CA_NS_07

| A-MPR for A = 0.5 with non-contiguous formula | Minimum A-MPR for contiguous allocation with A = 0.5 | | | A-MPR reduction for contiguous allocation | | |
|---|---|---|---|---|---|---|
| | 75 + 100/100 + 75 RB's | 50 + 100/100 + 50 RB's | 25 + 100/100 + 25 RB's | 75 + 100/100 + 75 RB's | 50 + 100/100 + 50 RB's | 25 + 100/100 + 25 RB's |
| 11 | 7 | 5 | 3 | 4 | 6 | 8 |

From Tables 1-3, it is apparent that contiguous allocations can be found with an allocation ratio of 0.5 for which the allowed A-MPR is much less than that allowed by the non-contiguous formulas. In some cases, the A-MPR reduction resulting from the use of the A-MPR table for contiguous allocations can be as much as 11.5 dB. However, as noted above, it is not possible to have a contiguous allocation with allocation ratio greater than or equal to 0.5 in subframes in which a PUCCH is transmitted on either component carrier.

In some cases where the allocation of resource blocks is "almost-contiguous," the A-MPR for a corresponding contiguous allocation can be used with an appropriate offset, or correction factor. An example of such an almost-contiguous allocation would be an allocation that is contiguous except for the PUCCH region (e.g., a contiguous allocation from which the PUCCH resource blocks have been punctured as illustrated in the diagram 400). In other examples, the punctured resource blocks can be allocated to semi-persistently scheduled Physical Uplink Shared Channel (PUSCH) resource blocks or for other purposes. More generally, a second non-contiguous A-MPR for any non-contiguous allocation can be derived from the A-MPR for a corresponding contiguous allocation with a correction factor, where the size of the correction factor depends on both the number of resource blocks in the corresponding contiguous allocation and the number of resource blocks punctured from the corresponding contiguous allocation. In some cases, the second A-MPR derived from the corresponding contiguous allocation will be less than the non-contiguous A-MPR formula defined in TS 36.101, while in other cases, the second A-MPR will be greater than the non-contiguous A-MPR defined in TS 36.101.

For the non-contiguous allocation, the mobile station (or base station) determines an overall bandwidth (e.g., L_CRB of diagram 400) of the allocation by filling in any gaps of unallocated resource blocks. Equivalently, the overall bandwidth of the non-contiguous allocation can be defined as the bandwidth L_CRB (in resource blocks) of the smallest contiguous allocation that contains the non-contiguous allocation. For the contiguous allocation, the mobile station determines the allowed A-MPR from the appropriate contiguous allocation A-MPR table using the determined overall bandwidth. The mobile station then uses an allocation correction factor added to the A-MPR value obtained from the tables. The allocation correction factor ensures that the power spectral density of the non-contiguous allocation is the same or less than that of the corresponding contiguous allocation from which its A-MPR was derived. More specifically, the A-MPR for the non-contiguous allocation is increased by the ratio of the number of resource blocks in the contiguous allocation (e.g., the non-contiguous allocation with gaps filled in) to the number of resource blocks in the non-contiguous allocation.

As one example of calculating A-MPR for a non-contiguous allocation, let A-MPR-C denote the A-MPR allowed for a contiguous allocation of L resource blocks and A-MPR-NC2 denote the second A-MPR allowed for a corresponding non-contiguous allocation in which K resource blocks have been punctured out of the contiguous allocation of L resource blocks. In this case, the A-MPR-NC2 is determined as the A-MPR-C with an allocation correction factor A-MPR-CF:

A-MPR-NC2=A-MPR-C+A-MPR-CF where

A-MPR-CF=$10*\log_{10}(L/(L-K))$.

Since K of the resource blocks of the contiguous allocation of L resource blocks are punctured, it follows that number of resource blocks M allocated to the mobile station is equal to L-K. Thus, the correction factor A-MPR-CF can also be written as:

A-MPR-CF=$10*\log_{10}(L/M)$.

We now consider the special case in which the non-contiguous allocation is punctured only by the PUCCH region. The resource-block allocation for the PUSCH transmissions in CC1 is such that the last allocated resource block is at the beginning of the higher frequency PUCCH region. In CC2, there is simultaneously a PUSCH transmission with RB_Start at the end of the lower frequency PUCCH region. According to TS 36.101, the A-MPR value for the aggregated component carriers is the allowed maximum output power reduction applied to transmissions on the Primary Component Carrier and the Secondary Component Carrier for contiguously aggregated component carriers. As illustrated in the diagram 400, L_CRB_CC1 and L_CRB_CC2 RBs start at RB_start1 and RB_start2, respectively. The A-MPR value is selected based on $L_{\_CRB}$ as follows:

$$L_{CRB} = L_{CRB\_CC1} + \text{PUCCH}_{HReg\_CC1} + \text{PUCCH}_{LReg\_CC2} + L_{CRB\_CC2}$$

The PUCCH region of each component carrier may be different but must have at least one resource block so that:

$$L_{CRB} > L_{CRB\_CC1} + L_{CRB\_CC2}$$

The mobile station first computes A-MPR as if it were assigned the PUCCH region resource blocks so that the allocation is contiguous. For allocations where $L_{\_CRB}$ includes the PUCCH transmission region, the mobile station must add an additional correction factor of:

A-MPR-CF=$10*\log 10(L_{CRB}/(L_{CRB}-\text{PUCCH}_{RegT}))$ where:

$\text{PUCCH}_{RegT} = \text{PUCCH}_{Reg\_CC1} + \text{PUCCH}_{Reg\_CC2}$

A specific example is now described for carrier aggregation for the 15 MHz+15 MHz case in combination with CA_NS_01 signaling. Each 15 MHz carrier has 75 resource blocks, so we number the resulting aggregated resource blocks 0, 1, . . . , 149. In this example, we assume that the mobile station is assigned a non-contiguous allocation of resource blocks 32 through 72 and 77 through 117. The number of resource blocks L in the smallest contiguous allocation containing this non-contiguous allocation is 86 resource blocks. The number of resource blocks K punctured from this smallest contiguous allocation is 4. The punctured resource blocks 73 and 74 may correspond to the higher frequency PUCCH region of the lower frequency component carrier, while the resource blocks 75 and 76 may correspond to the lower frequency PUCCH region of the higher frequency component carrier. From Table 6.2.4A.1-1 in TS 36.101 (shown below), the A-MPR for the contiguous allocation is 5 dB. For this example, the second non-contiguous A-MPR is thus given by:

$$A\text{-}MN\text{-}NC2 = A\text{-}MPR\text{-}C + A\text{-}MPR\text{-}CF$$
$$= A\text{-}MPR\text{-}C + 10*\log_{10}(L/(L-K))$$
$$= 5 + 10*\log_{10}(86/82) = 5.2 \text{ dB}.$$

TABLE 6.2.4A.1-1

(from 3GPP TS 36.101): Contiguous Allocation A-MPR for CA_NS_01

| CA_1C: CA_NS_01 | RB_Start | $L_{CRB}$ [RBs] | $RB_{start}$ + $L_{CRB}$ [RBs] | A-MPR for QPSK and 16-QAM [dB] |
|---|---|---|---|---|
| 100 RB/ 100 RB | 0-23 and 176-199 | >0 | n/a | ≤12.0 |
| | 24-105 | >64 | n/a | ≤6.0 |
| | 106-175 | n/a | >175 | ≤5.0 |
| 75 RB/ 75 RB | 0-6 and 143-149 | 0 < $L_{CRB}$ ≤ 10 | n/a | ≤11.0 |
| | | >10 | n/a | ≤6.0 |
| | 7-90 | >44 | n/a | ≤5.0 |
| | 91-142 | n/a | >142 | ≤2.0 |

Note 1:
$RB_{start}$ indicates the lowest RB index of transmitted resource blocks.
Note 2:
$L_{CRB}$ is the length of a contiguous resource-block allocation.
Note 3:
For intra-subframe frequency hopping which intersects regions, notes 1 and 2 apply on a per slot basis.
Note 4:
For intra-subframe frequency hopping which intersects regions, the larger A-MPR value may be applied for both slots in the subframe.

For CA_NS_01, the A-MPR formula for non-contiguous resource allocations is given (See TS 36.101 section 6.2.4A.1) by the following:

$$M_A = -22.5A + 17; \quad 0 \leq A < 0.20$$

$$-11.0A + 14.7; \quad 0.20 \leq A < 0.70$$

$$-1.7A + 8.2; \quad 0.70 \leq A \leq 1$$

For this example, the allocation ratio A is equal to 0.55 (=82/150), so that the non-contiguous A-MPR is given by:

$$M_A = -11.0A + 14.7$$
$$= -11.0(0.55) + 14.7$$
$$= 8.65 \text{ dB}.$$

Accordingly, for this example, the A-MPR determined using the second non-contiguous method is 3.5 dB less than the A-MPR determined using the non-contiguous method specified in TS 36.101. Other examples of improved A-MPR values for various CA_NS values will be apparent to those skilled in the art.

One issue with the allocation correction factor described above is that for some cases, the allocation correction factor provides for a larger A-MPR than the allocation ratio-based method already defined in TS 36.101. The allocation correction factor tends to work well when the number of punctured resource blocks K is small in comparison to the number of resource blocks L in the smallest containing non-contiguous allocation so that the allocation correction factor is small. However, in cases in which the number of punctured resource blocks K is large in comparison to the number of contiguous resource blocks in which it is embedded, the second non-contiguous method for determining A-MPR can perform poorly in that it allows much more A-MPR than is necessary in order to meet the emissions requirements. The reason for this poor performance is due to the fact that if the transmit power is reduced by the allocation correction factor (which is large when L−K≪L) in order to maintain the same spectral density as for the corresponding contiguous allocation (for those resource blocks that are not punctured), then the transceiver of the mobile station (or a power amplifier therein) is operating in a much more linear region in which spectral regrowth due to power amplifier non-linearity is greatly reduced. As a result, when L-K is small relative to L, the extra power reduction is much more than is necessary in order to meet emissions requirements.

A second example is now described for carrier aggregation for the 15 MHz+15 MHz case in combination with CA_NS_01 signaling. For this example, only the outer-most two resource blocks are allocated for the PUSCH. In this example, the number of resource blocks L of the smallest contiguous allocation containing the two allocated resource blocks is 150, the number of punctured resource blocks K is 148, and the allocation ratio is A=2/150=0.0133. For CA_NS_01, the A-MPR formula for non-contiguous resource allocations (See TS 36.101 section 6.2.4A.1) yields:

$$M_A = -22.5A + 17$$
$$= -22.5(0.0133) + 17$$
$$= 16.7$$

Thus, for this example, the A-MPR formula in TS 36.101 gives an A-MPR value equal to 16.7 dB.

Using the second non-contiguous method described above, the A-MPR is determined for the smallest contiguous allocation containing the non-contiguous allocation containing the non-contiguous allocation. For this example, the number of resource blocks L of the smallest containing contiguous allocation is 150. From Table 6.2.4A.1-1 in TS 36.101, the A-MPR for this contiguous allocation is 6 dB. The second A-MPR is then determined by adding a correction factor to this contiguous A-MPR. In this case, the number of resource blocks L for the smallest containing contiguous allocation is 150, and the number of punctured resource blocks K is 148, so that the second non-contiguous A-MPR is given by:

$$A\text{-}MN\text{-}NC2 = A\text{-}MPR\text{-}C + 10 * \log_{10}(L/(L-K))$$
$$= 6 + 10\log_{10}(150/2)$$
$$= 24.7 \text{ dB}.$$

Accordingly, the A-MPR determined using the second non-contiguous method is 8 dB greater than the A-MPR determined using the non-contiguous method. Thus, for this example, the existing method for computing A-MPR in TS 36.101 for computing A-MPR for non-contiguous allocations is preferred to the non-contiguous method because the resulting A-MPR is less.

As a result of the above two examples, it can be observed that for some examples the A-MPR for the second non-contiguous method is less than the A-MPR for the non-contiguous method, and for some examples the A-MPR for the second non-contiguous method is greater than for the non-contiguous method. In some cases, it may be desirable to only allow the second non-contiguous method for non-contiguous allocations in which only the PUCCH resource blocks are punctured from the corresponding contiguous allocations. Alternatively, it may be desirable to allow the second non-contiguous method only for non-contiguous allocations for which the correction factor A-MPR-CF is less than some maximum value. It can be noted that a limitation on A-MPR-CF is equivalent to a limitation on the ratio L/(L−K) for the non-contiguous allocation, where L is the number of resource blocks in the smallest contiguous allocation containing the non-contiguous allocation, and where K is the number of resource blocks punctured from the allocation. Similarly, a limitation on A-MPR-CF is equivalent to a limitation on the ratio L/M for the non-contiguous allocation, where M=L−K. Finally, in cases in which the allowed A-MPR is rounded up to the next 0.5 dB, the log function can be implemented as a set of thresholds applied to the ratio L/(L−K), or equivalently L/M, where a ratio that falls between two such thresholds is assigned a correction factor A-MPR-CF which is the appropriate multiple of 0.5 dB.

Figure 5:
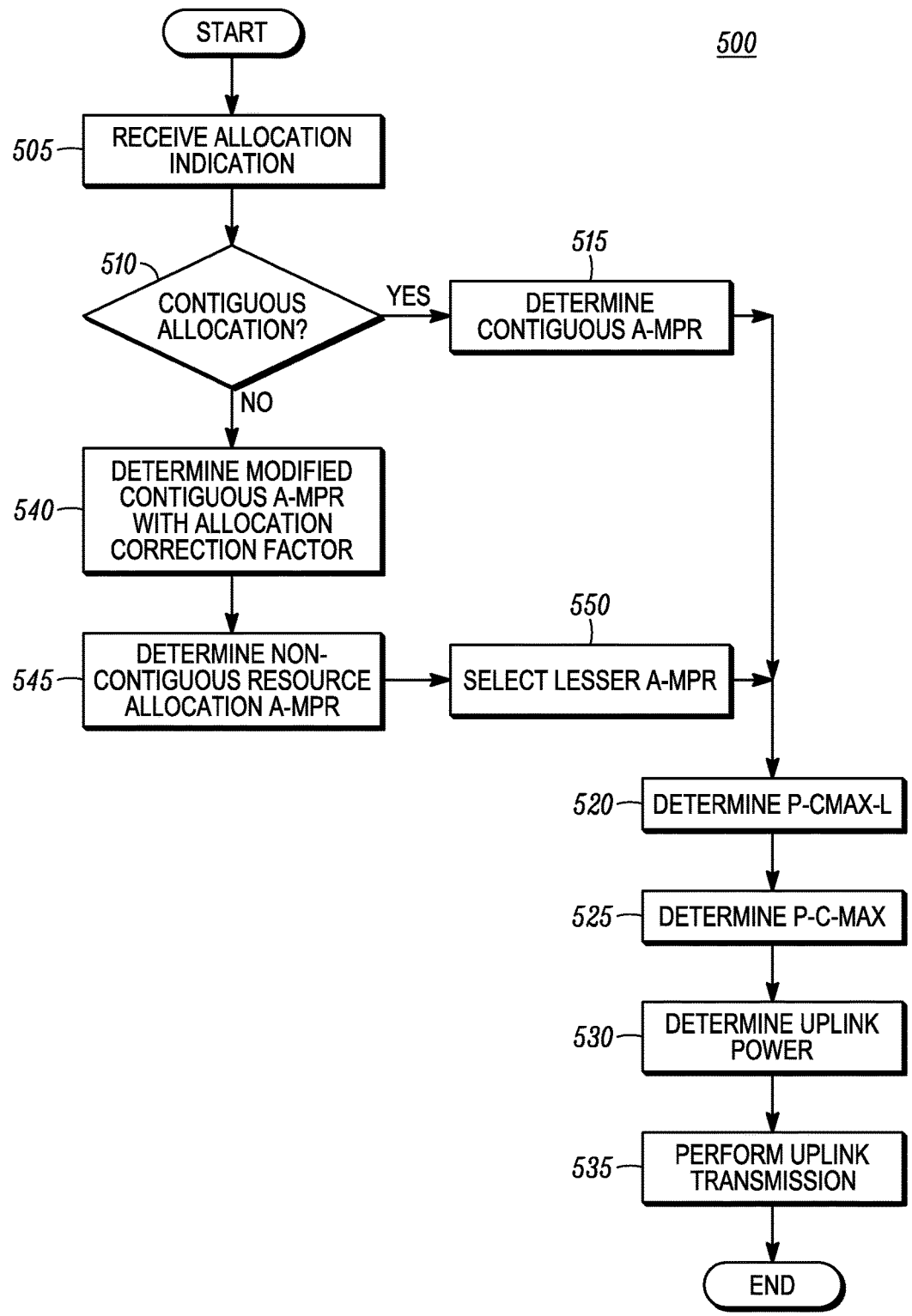
FIG. 5 is an example flowchart of a method for calculating an uplink transmission power according to a possible embodiment.

FIG. 5 is an example flowchart 500 of a method for calculating an uplink transmission power according to a possible embodiment. The method may be carried out by a mobile station, such as the mobile station 105. The mobile station selects a minimum of two A-MPR values for determination of uplink transmission power. The mobile station receives (Step 505) an allocation indication from the base station. The allocation indication in one example is a control message that indicates radio resources (e.g., resource blocks) allocated to the mobile station by the base station. The mobile station determines (Step 510) whether the allocation is a contiguous allocation.

If the allocation is contiguous (YES at Step 510), then the mobile station determines (Step 515) a contiguous A-MPR using the contiguous allocation tables as defined in TS 36.101. For uplink carrier aggregation, the mobile station is allowed to set its configured maximum output power $P_{CMAX,c}$ for a serving cell c (e.g., for a cell provided by the base station) and also its total configured maximum output power $P_{CMAX}$, as described in TS 36.101 (see section 6.2.5A). The total configured maximum output power $P_{CMAX}$ is to be set between $P_{CMAX\_L} \leq P_{CMAX} \leq P_{CMAX\_H}$. The mobile station determines (Step 520) lower bound $P_{CMAX\_L}$ based on the contiguous A-MPR according to TS 36.101. The mobile station then determines (Step 525) the $P_{CMAX}$ based on the $P_{CMAX\_L}$ and determines (Step 530) the uplink transmission power. The mobile station performs (Step 535) the uplink transmission based on the uplink transmission power.

If the allocation is not contiguous (NO at Step 510), then the mobile station determines (Step 540) a first A-MPR as a modified contiguous A-MPR with an allocation correction factor. In this case, the first A-MPR is based on a smallest contiguous allocation containing the non-contiguous allocation and the allocation correction factor. The mobile station determines the smallest contiguous allocation by filling in any gaps of unallocated resource blocks in the allocation; however, the "smallest contiguous allocation" is not actually allocated and is thus a hypothetical smallest contiguous allocation, as will be understood by those skilled in the art. The mobile station uses the smallest contiguous allocation containing the non-contiguous allocation to determine a contiguous A-MPR using the contiguous allocation tables as defined in TS 36.101. The contiguous allocation table lookup is based on at least one of a starting index of the non-contiguous allocation, an ending index of the non-contiguous allocation, the number M of allocated resource blocks in the non-contiguous allocation, or a modulation and coding scheme for the uplink transmission.

The mobile station determines the allocation correction factor based on a ratio of a number L of resource blocks in the smallest contiguous allocation containing the non-contiguous allocation to a number M of resource blocks in the non-contiguous allocation. For example, the mobile station determines the allocation correction factor as $10 \log_{10}(L/M)$. The mobile station determines the first A-MPR as a sum of the contiguous A-MPR and the allocation correction factor.

The mobile station determines (Step 545) a second A-MPR as a non-contiguous resource allocation A-MPR for the allocation. For example, the mobile station calculates the A-MPR by performing a predetermined function based on the allocation ratio, as described in TS 36.101. The mobile station determines the allocation ratio as a ratio of a number M of resource blocks in the non-contiguous allocation to a maximum number $N_{RB\_agg}$ of aggregated resource blocks available for the uplink transmission. The maximum number may be for a single carrier (e.g., 25 resource blocks for a 5 MHz carrier) or for multiple aggregated carriers (e.g., 150 resource blocks for two aggregated 15 MHz carriers). The mobile station selects the predetermined function based on the CA_NS value. For example, the mobile station determines a maximum output power based on the allocation ratio and the functions defined in TS 36.101 Sections 6.2.3A and 6.2.4A. After determination of the first and second A-MPRs (Steps 540 and 545), the mobile station selects (Step 550) a lesser of the first and second A-MPRs. The mobile station then determines the A-MPR according to A-MPR=CEIL {Z, 0.5}, where Z is the lesser of the first and second A-MPRs. In another example, the mobile station applies the CEIL function to the first A-MPR and the second A-MPR prior to selecting the lesser of the first and second A-MPRs.

The mobile station calculates the uplink transmission power based on the selected A-MPR. For example, the mobile station performs Steps 520, 525, and 530 using the selected A-MPR instead of the contiguous A-MPR. The mobile station then performs (Step 535) the uplink transmission based on the uplink transmission power.

Figure 6:
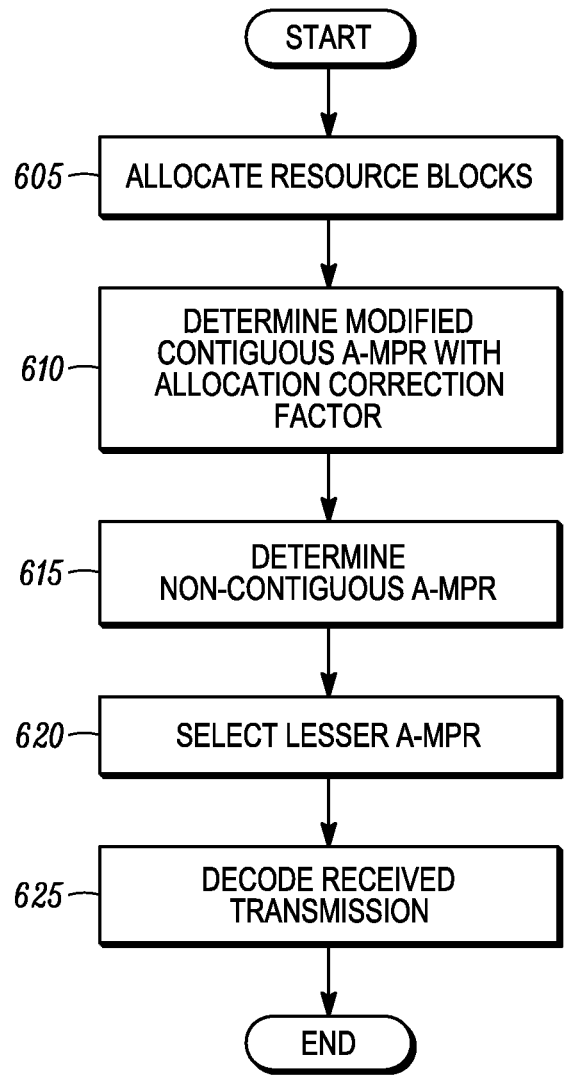
FIG. 6 is a flowchart of a method for decoding an uplink transmission according to a possible embodiment.

FIG. 6 is a flowchart 600 of a method for decoding an uplink transmission according to a possible embodiment. The method may be carried out by a base station, such as the base station 120. The base station allocates (Step 605) a non-contiguous allocation of resource blocks for the uplink transmission from the mobile station. The base station sends an indication of the allocated resource blocks to the mobile station (e.g., via a control message).

The base station determines (Step 610) a first A-MPR based on a smallest contiguous allocation containing the non-contiguous allocation and an allocation correction factor. The base station determines the allocation correction factor based on a ratio of a number L of resource blocks in the smallest contiguous allocation to a number M of resource blocks in the non-contiguous allocation. For example, the base station determines the allocation correction factor as $10 \log_{10}(L/M)$. The base station determines the first A-MPR as a sum of the contiguous A-MPR and the allocation correction factor.

The base station determines (Step 615) a second A-MPR as a non-contiguous A-MPR for the non-contiguous allocation. For example, the base station calculates the A-MPR by performing a predetermined function based on the allocation ratio, as described in TS 36.101. The base station determines the allocation ratio as a ratio of a number M of resource blocks in the non-contiguous allocation to a maximum number $N_{RB\_agg}$ of aggregated resource blocks available for the uplink transmission. The base station selects the predetermined function based on the CA_NS value. For example, the base station determines a maximum output power based on the allocation ratio and the functions defined in TS 36.101 Sections 6.2.3A and 6.2.4A. The base station then determines the second A-MPR according to A-MPR=CEIL {$M_A$, 0.5}.

The base station selects (Step 620) a lesser of the first and second A-MPRs. The base station decodes (Step 625) a received uplink transmission based on the non-contiguous allocation of resource blocks and the selected A-MPR. For example, the base station receives the uplink transmission using the allocated resource blocks. In some embodiments, the base station selects a modulation and coding scheme based on the selected A-MPR. The base station sends the selected MCS to the mobile station in the control message and decodes the uplink transmission using the selected MCS. The base station also performs channel estimation, including path loss estimation, for the uplink transmission based on the selected A-MPR.

The disclosed embodiments may be described in terms of functional block components and various processing steps. Such functional blocks may be realized by any number of hardware or software components configured to perform the specified functions.

The following description is directed to additional embodiments that are supported by, but not limited to the above embodiments.

According to the above, an almost-contiguous resource allocation is a resource allocation which is contiguous across a boundary between the two carriers except that it is punctured by the PUCCH region. For these almost-contiguous allocations, an almost-contiguous A-MPR can be the sum of the A-MPR for the smallest contiguous allocation containing the almost-contiguous allocation and 10×log of the ratio of the number of RB's in the smallest containing contiguous allocation and the number of RB's in the almost-contiguous allocation.

However, there are still some factors to be addressed, and these relate to the definition of the almost-contiguous allocation. In a most general sense, an almost-contiguous allocation can be defined as a non-contiguous resource allocation spanning the boundary between two aggregated carriers which is equivalent to a first contiguous resource allocation punctured by a second contiguous resource allocation where the second contiguous resource allocation spans the boundary between the aggregated carriers.

There are several factors with this definition. In particular, the definition may be too general. For this definition, an allocation consisting of two RB's with the first RB being the lowest frequency RB on the first carrier and the second RB being the highest frequency RB on the upper carrier, would be classified as almost-contiguous, and the almost-contiguous A-MPR would apply (the final A-MPR is the minimum of the almost-contiguous A-MPR and the non-contiguous A-MPR). In this case, the estimate of the A-MPR that is needed for the almost-contiguous resource allocation will be most accurate when it is based on the A-MPR for a contiguous allocation that is only slightly different from the almost-contiguous allocation. For this example with only two RB's, the allowed A-MPR would be based on a contiguous allocation having 200 RB's.

Another factor with such a general definition is that it may be difficult to verify by simulation that the allowed A-MPR is sufficient, since the number of cases to simulate is very large. In general, it may be necessary to simulate every possible contiguous allocation for every possible gap size in order to verify that the allowed A-MPR is sufficient. A final factor with such a general definition is that it may be more general than is necessary in order to solve the problem of the PUCCH blocking contiguous allocations, since the PUCCH region is typically fairly small and is generally allocated at the edge of the carrier.

Given that the above definition may be more general than necessary, embodiments can provide for determining when almost-contiguous A-MPR apply should apply. Furthermore, depending on when almost-contiguous A-MPR applied, embodiments can provide for signaling, or the absence thereof, to support the application.

According to a possible embodiment, almost-contiguous A-MPR can apply for PUCCH puncturing. According to a possible implementation, the almost-contiguous A-MPR may only apply for PUCCH puncturing. The UE can be informed that the allocation is only punctured by PUCCH by signalling the entire PUCCH region to the UE, using Radio Link Control (RLC) signaling, via a System Information Block (SIB), or by any other method of signalling. The UE can also be informed that the allocation is only punctured by PUCCH by the eNB sending a bit with each allocation indicating the allocation is only punctured by the PUCCH.

According to another possible embodiment, almost-contiguous A-MPR can apply when the gap is less than a maximum value, W, of RB's. The maximum value of W can be fixed in the specification, can be configured by the eNB subject to a maximum value, or can be otherwise determined. The maximum value can be signaled to the UE from the eNB. The maximum value of W can be specified in 36.101. Furthermore, W can be specified per CA combination, per bandwidth combination, and per CA_NS_0x signaled. It also may be sufficient to specify a single value that applies for all CA combinations, all bandwidth combinations, and all CA_NS_0x.

According to another possible embodiment, contiguous A-MPR can apply when a left gap is less than X and a right gap is less than Y. The values of X and Y can be fixed in the specification or can be configured by the eNB subject to a maximum value in the specification. If X and Y are configured, these values can be signaled or otherwise provided to the UE. For example, the maximum value of X and Y can be specified in 36.101. X and Y can also be specified per CA combination, per bandwidth combination, and per CA_NS_0x signaled. It may further be sufficient to specify a single value that applies for all CA combinations, all bandwidth combinations, and all CA_NS_0x.

Figure 7:
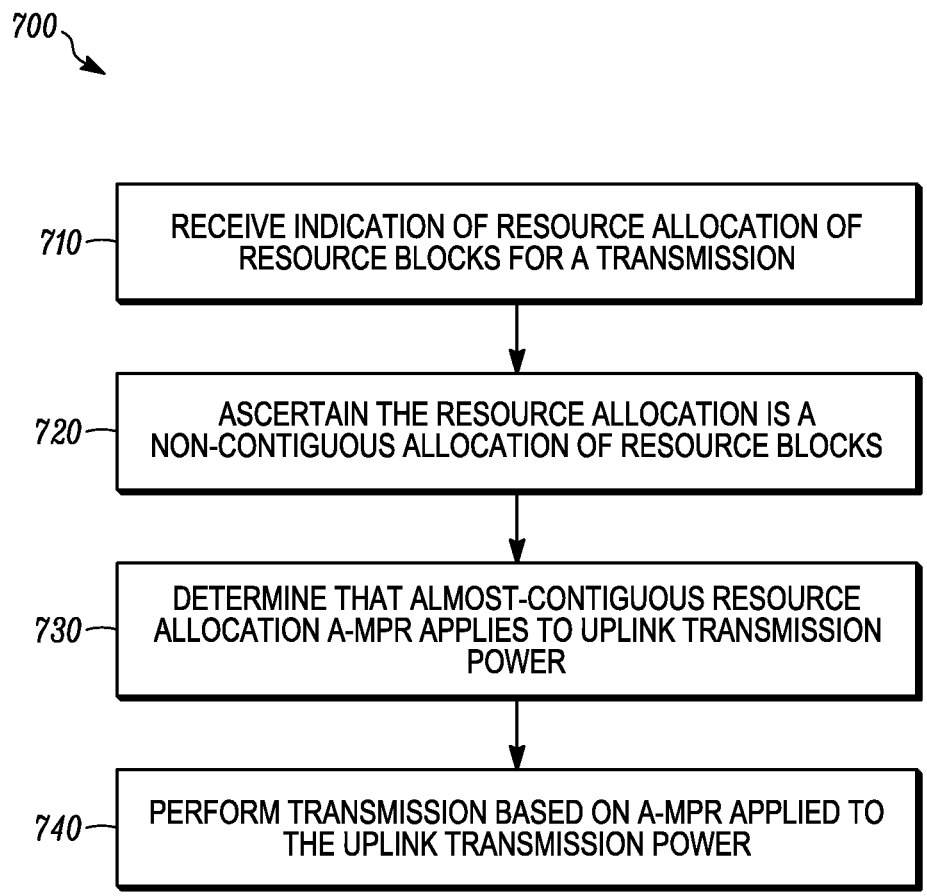
FIG. 7 is an example flowchart illustrating the operation of a wireless communication device according to a possible embodiment.

FIG. 7 is an example flowchart 700 illustrating the operation of a wireless communication device, such as the mobile station 105, the base station 120, and/or any other device that communicates over a wireless network, according to a possible embodiment. At 710, an indication of a resource allocation of resource blocks for a transmission can be received.

At 720, the resource allocation can be ascertained to be a non-contiguous allocation of resource blocks. A contiguous allocation of resource blocks can be a resource allocation of consecutive resource blocks within a lower frequency carrier, such as the component carrier CC1 described above, and an adjacent upper frequency carrier, such as the component carrier CC2 described above, that is adjacent to the lower frequency carrier in the frequency domain. For example, a contiguous resource allocation can be defined as a resource allocation of consecutive resource blocks across contiguously aggregated carriers, such as the two adjacent component carriers CC1 and CC2 described above. A carrier can be a bandwidth configuration used for transmission in LTE. A nominal gap between contiguously aggregated carriers due to the nominal channel spacing can be allowed while still considering the resource allocation a contiguous resource allocation. A non-contiguous allocation can include at least one resource block that is not allocated for the transmission in between resource blocks that are allocated for the transmission in the resource allocation. The resource allocation can be determined to be non-contiguous based on the allocation itself, based on information in the indication of the resource allocation, or based on any other element for determining that a resource allocation is non-contiguous.

At 730, an almost-contiguous resource allocation Additional Maximum Power Reduction (A-MPR) can be determined to apply to an uplink transmission power for the transmission. An almost-contiguous resource allocation is defined as a contiguous resource allocation of resource blocks, such as the resource blocks in the bandwidth L_CRB described above, from which resource blocks are punctured and the punctured resource blocks are contained in a contiguous region overlapping a boundary between the lower frequency carrier and the adjacent upper frequency carrier, such as a boundary between the two adjacent component carriers CC1 and CC2 described above. Punctured resource blocks can be resource blocks that are not allocated for the transmission. For example, an almost-contiguous allocation can be a non-contiguous allocation where the allocation is contiguous but for the punctured resource blocks contained in the contiguous region overlapping the boundary between the lower frequency carrier and the adjacent upper frequency carrier.

A number of resource blocks in a first part of the contiguous region overlapping the boundary and contained within the lower frequency carrier can be less than a lower frequency carrier maximum value. Also, a number of resource blocks in a second part of the contiguous region overlapping the boundary and contained within the upper frequency carrier can be less than an upper frequency carrier maximum value. Additionally, the total resource blocks in the contiguous region overlapping the boundary can be less than a maximum value.

The punctured resource blocks in the contiguous region overlapping the boundary can be contiguous punctured resource blocks. The contiguous punctured resource blocks can create a gap between contiguous resource blocks in the non-contiguous allocation of resource blocks. The gap can include at least one resource block and a size of a gap can be less than a maximum value. A signal can be received that indicates the maximum value, the maximum value can be preset, or the maximum value can be otherwise determined.

The maximum value of the size of the gap can be the size of a control channel. For example, the control channel can be a Physical Uplink Control Channel (PUCCH). According to a possible implementation, the entire PUCCH can be signaled to the device, such as by using Radio Link Control (RLC) signaling, using a System Information Block (SIB), or by using any other method for signaling a PUCCH. According to another possible implementation, the signaling device can send a bit with each non-contiguous allocation indicating the allocation is only punctured by the PUCCH. The gap can also be for Physical Uplink Shared Channel (PUSCH) resource blocks and/or for other purposes.

The maximum value of the size of the gap can also be a size of the total punctured resource blocks in the lower frequency carrier being less than a maximum value and a size of the total punctured resource blocks in the upper frequency carrier being less than a maximum value. The maximum value can be the same for a carrier aggregation combination, a bandwidth combination, and/or a carrier aggregation network signaling value.

The maximum value can be based on a carrier aggregation combination, a bandwidth combination, and/or a carrier aggregation network signaling value. For example, as discussed above, for contiguous allocations, there can be up to nine or more tables defined that can specify allowed A-MPR values based on a Carrier Aggregation Network Signaling value (CA_NS). The allowed A-MPR values for non-contiguous allocations can be defined in up to nine or more formulas based on a carrier aggregation network signaling value. The carrier aggregation network signaling value can indicate extra requirements on transmitter emissions, such as a maximum power spectral density in a given frequency range and other extra requirements on transmitter emissions. The carrier aggregation network signaling value can also indicate extra A-MPR allowed to meet the extra emission requirements. CA_NS signaling can be used for intra-band contiguous aggregation. The first of these formulas can apply in the event that CA_NS_31 is signaled and no extra emissions requirements apply. For example, CA_NS_31 can be used for no extra requirements. The eight remaining formulas can be defined for use with the signaling of CA_NS_01, CA_NS_02, CA_NS_03, CA_NS_04, CA_NS_05, CA_NS_06, CA_NS_07, and CA_NS_08. Other tables, other carrier aggregation network signaling values, and different formulas can also be used. A transmitting device, such as a UE, can transmit a maximum output power that is within a range of power values set by the specification. The maximum output power can depend on a set of resource blocks allocated to the UE for transmission. The A-MPR can be an additional maximum power reduction that the UE can use to reduce the allowed minimum value of its maximum output power.

Almost-contiguous can also be considered mostly-contiguous, partially-contiguous, or any other term that indicates a size of a gap between contiguous resource blocks, such as a gap between L_CRB_CC1 and L_CRB_CC2 described above, in a non-contiguous allocation of resource blocks being less than a maximum value.

At 740, the transmission can be performed based on the uplink transmission power with the applied A-MPR. The transmission can be a carrier aggregation uplink transmission.

Figure 8:
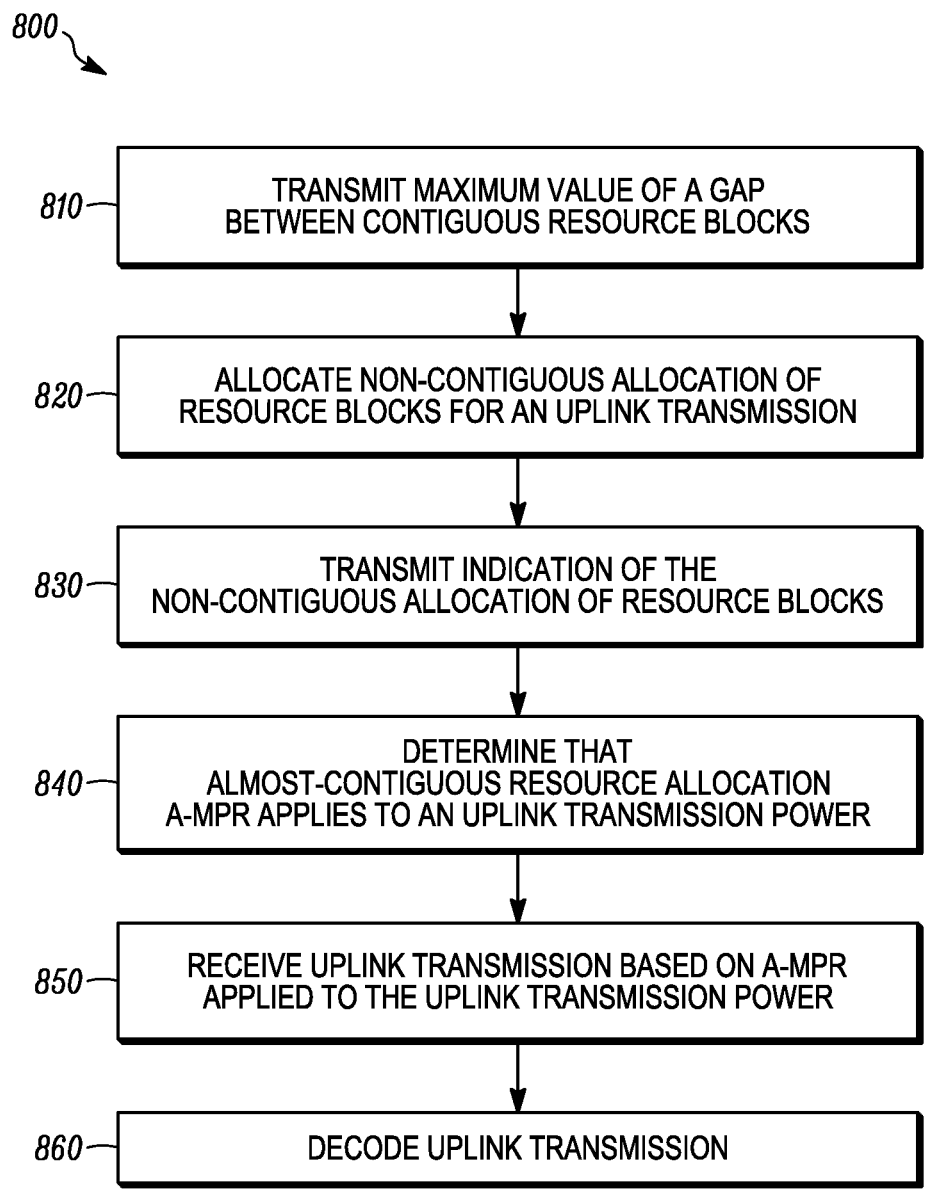
FIG. 8 is an example flowchart illustrating the operation of a wireless communication device according to a possible embodiment.

FIG. 8 is an example flowchart 800 illustrating the operation of a wireless communication device, such as the mobile station 105, the base station 120, and/or any other device that communicates over a wireless network, according to a possible embodiment. At 810, a signal indicating a maximum value of a gap between contiguous resource blocks for an almost-contiguous resource allocation can be transmitted. At 820, a non-contiguous allocation of resource blocks can be allocated for an uplink transmission from a mobile station. At 830, an indication of the non-contiguous allocation of resource blocks can be transmitted for the uplink transmission from the mobile station.

At 840, an almost-contiguous resource allocation Additional Maximum Power Reduction (A-MPR) can be determined to apply to an uplink transmission power for the transmission. The almost-contiguous resource allocation can be defined as a contiguous resource allocation of resource blocks from which resource blocks are punctured and the punctured resource blocks are contained in a contiguous region overlapping a boundary between the lower frequency carrier and the adjacent upper frequency carrier. The punctured resource blocks can be resource blocks that are not allocated for the transmission. The punctured resource blocks can create a gap between contiguous resource blocks in the non-contiguous allocation of resource blocks. The size of the gap can be less than a maximum value. The maximum value of the gap size can be based on the signal indicating the maximum value, can be predetermined, or can be otherwise determined.

At 850, an uplink transmission can be received based on the uplink transmission power with the applied A-MPR. At 860, the uplink transmission can be decoded based on the non-contiguous allocation of resource blocks and the uplink transmission power with the applied A-MPR.

It should be understood that, notwithstanding the particular steps as shown in the figures, a variety of additional or different steps can be performed depending upon the embodiment, and one or more of the particular steps can be rearranged, repeated or eliminated entirely depending upon the embodiment. Also, some of the steps performed can be repeated on an ongoing or continuous basis simultaneously while other steps are performed. Furthermore, different steps can be performed by different elements or in a single element of the disclosed embodiments.

Figure 9:
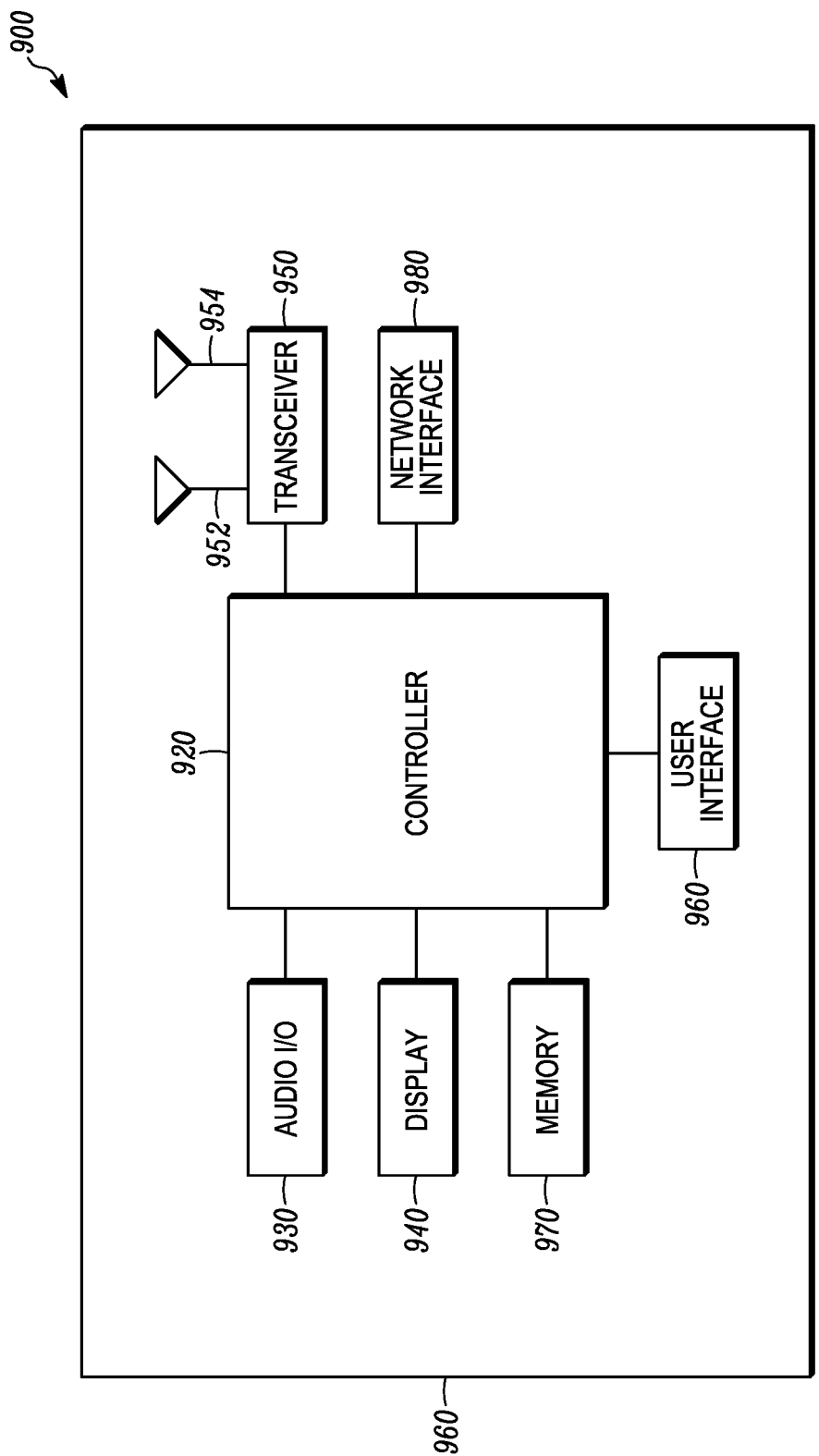
FIG. 9 is an example block diagram of an apparatus according to a possible embodiment.

FIG. 9 is an example block diagram of an apparatus 900, such as the mobile station 105, the base station 120, and/or any other device that communicates over a wireless network, according to a possible embodiment. The apparatus 900 can include a housing 910, a controller 920 within the housing 910, audio input and output circuitry 930 coupled to the controller 920, a display 940 coupled to the controller 920, a transceiver 950 coupled to the controller 920, antennas 952 and 954 coupled to the transceiver 950, a user interface 960 coupled to the controller 920, a memory 970 coupled to the controller 920, and a network interface 980 coupled to the controller 920. All of the illustrated elements of the apparatus 900 may not be necessary depending on the implementation of the apparatus 900. The apparatus 900 can perform the methods described in all the embodiments.

The display 940 can be a viewfinder, a liquid crystal display (LCD), a light emitting diode (LED) display, a plasma display, a projection display, a touch screen, or any other device that displays information. The transceiver 950 can include a transmitter and/or a receiver. The audio input and output circuitry 930 can include a microphone, a speaker, a transducer, or any other audio input and output circuitry. The user interface 960 can include a keypad, a keyboard, buttons, a touch pad, a joystick, a touch screen display, another additional display, or any other device useful for providing an interface between a user and an electronic device. The network interface 980 can be a Universal Serial Bus (USB) port, an Ethernet port, an infrared transmitter/receiver, an IEEE 1394 port, a WLAN transceiver, or any other interface that can connect an apparatus to a network, device, or computer and that can transmit and receive data communication signals. The memory 970 can include a random access memory, a read only memory, an optical memory, a flash memory, a removable memory, a hard drive, a cache, and/or any other memory that can be coupled to a wireless communication device.

The apparatus 900 or the controller 920 may implement any operating system, such as Microsoft Windows®, UNIX®, or LINUX®, Android™, or any other operating system. Apparatus operation software may be written in any programming language, such as C, C++, Java or Visual Basic, for example. Apparatus software may also run on an application framework, such as, for example, a Java® framework, a .NET® framework, or any other application framework. The software and/or the operating system may be stored in the memory 970 or elsewhere on the apparatus 900. The apparatus 900 or the controller 920 may also use hardware to implement disclosed operations. For example, the controller 920 may be any programmable processor. Disclosed embodiments may also be implemented on a general-purpose or a special purpose computer, a programmed microprocessor or microprocessor, peripheral integrated circuit elements, an application-specific integrated circuit or other integrated circuits, hardware/electronic logic circuits, such as a discrete element circuit, a programmable logic device, such as a programmable logic array, field programmable gate-array, or the like. In general, the controller 920 may be any controller or processor device or devices capable of operating a wireless communication device and implementing the disclosed embodiments.

In operation as a wireless communication device that receives an allocation of resource blocks, the transceiver 950 can receive an indication of a resource allocation of resource blocks for a transmission. The controller 920 can ascertain the resource allocation is a non-contiguous allocation of resource blocks. A contiguous allocation of resource blocks can be a resource allocation of consecutive resource blocks within a lower frequency carrier and an adjacent upper frequency carrier that is adjacent to the lower frequency carrier in the frequency domain.

The controller 920 can determine that an almost-contiguous resource allocation Additional Maximum Power Reduction (A-MPR) applies to an uplink transmission power for the transmission. An almost-contiguous resource allocation can be defined as a contiguous resource allocation of resource blocks from which resource blocks can be punctured and the punctured resource blocks can be contained in a contiguous region overlapping a boundary between the lower frequency carrier and the adjacent upper frequency carrier. The punctured resource blocks can be resource blocks that are not allocated for the transmission. A number of resource blocks in a first part of the contiguous region overlapping the boundary and contained within the lower frequency carrier can be less than a lower frequency carrier maximum value. A number of resource blocks in a second part of the contiguous region overlapping the boundary and contained within the upper frequency carrier can be less than an upper frequency carrier maximum value. Also, a total number of the resource blocks in the contiguous region overlapping the boundary can be less than a maximum value.

The punctured resource blocks in the contiguous region overlapping the boundary can be contiguous punctured resource blocks. The contiguous punctured resource blocks can create a gap between contiguous resource blocks in the non-contiguous allocation of resource blocks. The gap can include at least one resource block and a size of the gap can be less than a maximum value. The maximum value of the size of the gap can include a size of the total punctured resource blocks in the lower frequency carrier being less than a maximum value and a size of the total punctured resource blocks in the upper frequency carrier being less than a maximum value. The transceiver 950 can perform the transmission based on the uplink transmission power with the applied A-MPR.

In operation as a wireless communication device that allocates resource blocks, the controller 920 can allocate a non-contiguous allocation of resource blocks for an uplink transmission from a mobile station. The transceiver 950 can transmit an indication of the non-contiguous allocation of resource blocks for a transmission. The controller 920 can determine that an almost-contiguous resource allocation Additional Maximum Power Reduction (A-MPR) applies to an uplink transmission power for the transmission. An almost-contiguous resource allocation can be defined as a contiguous resource allocation of resource blocks from which resource blocks are punctured and the punctured resource blocks are contained in a contiguous region overlapping a boundary between the lower frequency carrier and the adjacent upper frequency carrier. The punctured resource blocks can be resource blocks that are not allocated for the transmission. The transceiver 950 can receive an uplink transmission based on the uplink transmission power with the applied A-MPR.

The method of this disclosure can be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures may be used to implement the processor functions of this disclosure.

While this disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, relational terms such as "first," "second," and the like may be used solely to distinguish one entity or action from another entity or action without necessarily requiring or implying any actual such relationship or order between such entities or actions. The phrase "at least one of" or "at least one selected from the group of" followed by a list is defined to mean one, some, or all, but not necessarily all of, the elements in the list. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising." Furthermore, the background section is written as the inventor's own understanding of the context of some embodiments at the time of filing and includes the inventor's own recognition of any problems with existing technologies and/or problems experienced in the inventor's own work.

I claim:

1. A method comprising:
   receiving an indication of a resource allocation of resource blocks for a transmission;
   ascertaining the resource allocation is a non-contiguous allocation of resource blocks, where a contiguous allocation of resource blocks is a resource allocation of consecutive resource blocks within a lower frequency carrier and an adjacent upper frequency carrier that is adjacent to the lower frequency carrier in the frequency domain;
   determining that an almost-contiguous resource allocation Additional Maximum Power Reduction (A-MPR) applies to an uplink transmission power for the transmission,
     where the almost-contiguous resource allocation is defined as a contiguous resource allocation of resource blocks from which resource blocks are punctured and the punctured resource blocks are contained in a contiguous region overlapping a boundary between the lower frequency carrier and the adjacent upper frequency carrier,
     where punctured resource blocks comprise resource blocks that are not allocated for the transmission, and
     where the A-MPR is defined by A-MPR-NC2=A-MPR-C+10*log 10 (L/(L−K)), where A-MPR-C is a first A-MPR allowed for a contiguous allocation of a number L of resource blocks, and where A-MPR-NC2 is a second A-MPR allowed for a corresponding non-contiguous allocation in which K resource blocks have been punctured out of the contiguous allocation of L resource blocks; and
   performing the transmission based on the uplink transmission power with the applied A-MPR.

2. The method according to claim 1, wherein a number of punctured resource blocks in a first part of the contiguous region overlapping the boundary and contained within the lower frequency carrier is less than a lower frequency carrier threshold and a number of punctured resource blocks in a second part of the contiguous region overlapping the boundary and contained within the upper frequency carrier is less than an upper frequency carrier threshold value.

3. The method according to claim 1, wherein the total punctured resource blocks in the contiguous region overlapping the boundary is less than a threshold value.

4. The method according to claim 1, wherein the punctured resource blocks in the contiguous region overlapping the boundary are contiguous punctured resource blocks.

5. The method according to claim 4, wherein the contiguous punctured resource blocks comprise a gap between contiguous resource blocks in the non-contiguous allocation of resource blocks, where the gap includes at least one resource block and a size of the gap is less than a threshold value.

6. The method according to claim 5, wherein the threshold value of the size of the gap comprises the size of a control channel.

7. The method according to claim 5, wherein the threshold value of the size of the gap comprises a size of the total punctured resource blocks in the lower frequency carrier being less than a threshold value and a size of the total punctured resource blocks in the upper frequency carrier being less than a threshold value.

8. The method according to claim 5, wherein the threshold value is based on at least one selected from the group of a carrier aggregation combination, a bandwidth combination, and a carrier aggregation network signaling value.

9. The method according to claim 5, wherein the threshold value is the same for at least one selected from the group of a carrier aggregation combination, a bandwidth combination, and a carrier aggregation network signaling value.

10. The method according to claim 5, further comprising receiving a signal indicating the threshold value.

11. A method comprising:
allocating a non-contiguous allocation of resource blocks for an uplink transmission from a mobile station;
transmitting an indication of the non-contiguous allocation of resource blocks for the uplink transmission;
determining that an almost-contiguous resource allocation Additional Maximum Power Reduction (A-MPR) applies to an uplink transmission power for the uplink transmission,
where the almost-contiguous resource allocation is defined as a contiguous resource allocation of resource blocks from which resource blocks are punctured and the punctured resource blocks are contained in a contiguous region overlapping a boundary between the lower frequency carrier and the adjacent upper frequency carrier,
where punctured resource blocks comprise resource blocks that are not allocated for the transmission, and
where the A-MPR is defined by A-MPR-NC2=A-MPR-C+10*log 10 (L/(L−K)), where A-MPR-C is a first A-MPR allowed for a contiguous allocation of a number L of resource blocks, and where A-MPR-NC2 is a second A-MPR allowed for a corresponding non-contiguous allocation in which K resource blocks have been punctured out of the contiguous allocation of L resource blocks; and
receiving an uplink transmission based on the uplink transmission power with the applied A-MPR.

12. The method according to claim 11,
wherein the punctured resource blocks comprise a gap between contiguous resource blocks in the non-contiguous allocation of resource blocks, where a size of the gap is less than a threshold value, and
wherein the method further comprises transmitting a signal indicating the threshold value.

13. The method according to claim 11, further comprising decoding the uplink transmission based on the non-contiguous allocation of resource blocks and the uplink transmission power with the applied A-MPR.

14. An apparatus comprising:
a transceiver to receive an indication of a resource allocation of resource blocks for a transmission; and
a controller to
ascertain the resource allocation is a non-contiguous allocation of resource blocks, where a contiguous allocation of resource blocks is a resource allocation of consecutive resource blocks within a lower frequency carrier and an adjacent upper frequency carrier that is adjacent to the lower frequency carrier in the frequency domain, and
determine that an almost-contiguous resource allocation Additional Maximum Power Reduction (A-MPR) applies to an uplink transmission power for the transmission, where the almost-contiguous resource allocation is defined as a contiguous resource allocation of resource blocks from which resource blocks are punctured and the punctured resource blocks are contained in a contiguous region overlapping a boundary between the lower frequency carrier and the adjacent upper frequency carrier, where punctured resource blocks comprise resource blocks that are not allocated for the transmission, and where the A-MPR is defined by A-MPR-NC2=A-MPR-C+10*log 10 (L/(L−K)), where A-MPR-C is a first A-MPR allowed for a contiguous allocation of a number L of resource blocks, and where A-MPR-NC2 is a second A-MPR allowed for a corresponding non-contiguous allocation in which K resource blocks have been punctured out of the contiguous allocation of L resource blocks,
wherein the transceiver performs the transmission based on the uplink transmission power with the applied A-MPR.

15. The apparatus according to claim 14,
wherein a number of punctured resource blocks in a first part of the contiguous region overlapping the boundary and contained within the lower frequency carrier is less than a lower frequency carrier threshold value and a number of punctured resource blocks in a second part of the contiguous region overlapping the boundary and contained within the upper frequency carrier is less than an upper frequency carrier threshold value.

16. The apparatus according to claim 14,
wherein a total number of the punctured resource blocks in the contiguous region overlapping the boundary is less than a threshold value.

17. The apparatus according to claim 14,
wherein the punctured resource blocks in the contiguous region overlapping the boundary are contiguous punctured resource blocks.

18. The apparatus according to claim 17,
wherein the contiguous punctured resource blocks comprise a gap between contiguous resource blocks in the non-contiguous allocation of resource blocks, where the gap includes at least one resource block and a size of the gap is less than a threshold value.

19. The apparatus according to claim 18, wherein the threshold value of the size of the gap comprises a size of the total punctured resource blocks in the lower frequency carrier being less than a threshold value and a size of the total punctured resource blocks in the upper frequency carrier being less than a threshold value.

20. An apparatus comprising:
a controller to allocate a non-contiguous allocation of resource blocks for an uplink transmission from a mobile station; and
a transceiver to transmit an indication of the non-contiguous allocation of resource blocks for a transmission,
wherein the controller determines that an almost-contiguous resource allocation Additional Maximum Power Reduction (A-MPR) applies to an uplink transmission power for the transmission, where the almost-contiguous resource allocation is defined as a contiguous resource allocation of resource blocks from which resource blocks are punctured and the punctured resource blocks are contained in a contiguous region overlapping a boundary between the lower frequency carrier and the adjacent upper frequency carrier, where punctured resource blocks comprise resource blocks that are not allocated for the transmission, and where the A-MPR is defined by A-MPR-NC2=A-MPR-C+10*log 10 (L/(L−K)), where A-MPR-C is a first A-MPR allowed for a contiguous allocation of a number L of resource blocks, and where A-MPR-NC2 is a second A-MPR allowed for a corresponding non-contiguous allocation in which K resource blocks have been punctured out of the contiguous allocation of L resource blocks, and wherein the transceiver receives an uplink transmission based on the uplink transmission power with the applied A-MPR.

\* \* \* \* \*